United States Patent [19]
Howe

[11] Patent Number: 6,157,901
[45] Date of Patent: Dec. 5, 2000

[54] TYPE ANNOTATION METHOD FOR USE IN VERIFICATION TOOLS

[75] Inventor: Douglas J. Howe, Berkeley Heights, N.J.

[73] Assignee: Lucent Technologies Inc., Murray Hill, N.J.

[21] Appl. No.: 09/139,186

[22] Filed: Aug. 25, 1998

[51] Int. Cl.$^7$ ..................................................... G06F 17/10
[52] U.S. Cl. ........................................ 703/2; 716/4; 716/5
[58] Field of Search ................................ 703/2; 716/5, 6, 716/4; 717/4

[56] References Cited

U.S. PATENT DOCUMENTS 5,032,988   7/1991   van der Linden ........................ 700/90

OTHER PUBLICATIONS

A. Felty, D. Howe and F. Stomp, "Protocol Verification In Nuprl," *CAV'98*, Lecture Notes in Computer Science, Springer–Verlag, Jun. 28, 1998.

D. J. Howe, "On Computational Open–Endedness in Martin–Lof's Type Theory," *Proceedings of the Sixth Annual Symposium on Logic in Computer Sciences*, IEEE Computer Society, 1991, pp. 162–172.

D. J. Howe, "Semantics Foundations for Embedding HOL in Nuprl," *Algebraic Methodology and Software Technology*, M. Wirsing and M. Nivat, eidtors, vol. 1101, Lecture Notes in Computer Science, Berlin, 1996, Springer–Verlag, pp. 85–101.

P. B. Jackson, "Exploring Abstract Algebra in Constructive Type Theory," *12th Conference on Automated Deduction, Lecture Notes in Artificial Intelligence*, A. Bundy, editor, Springer, Jun. 1994.

S. Owre and N. Shankar The Formal Semantics of PVS. Technical report, SRI, Aug. 1997.

B. Werner, "Sets in Types, Types in Sets," *International Symposium on Theoretical Aspects of computer Software*.

A. Felty and F. Stomp, "A Correctness Proof of a Cache Coherence Protocol," *Proceedings of the 11th Annual Conference on Computer Assurance*, Jun. 1996, pp.128–141.

C.T. Chou and D. Peled, "Formal Verification of a Partial–Order Reduction Technique for Model Checking," *Tools and Algorithms for the Construction and Analysis of Systems*, No. 1055 in LNCS, Passau, Germany, 1996, Springer–Verlag, pp. 241–257.

Vermuri et al., "Generation of Design Verification Tests from Behavioral VHDL Programs Using Path Enumeration and Constraint Programming", IEEE Trans. on VLSI Systems, vol. 3, Issue 2, pp. 201–214, Jun. 1995.

Aagaard et al, "Verifying a Logic–Synthesis Algorithm and Implementation: A Case Study in Software Verification", IEEE Transactions on Software Engineering, vol. 21, Issue 10, pp. 822–833, Oct. 1995.

Kurshan, "Formal Verification in a Formal Setting", Proc. Of the 34th Annual Conference on Design Automation, pp. 258–262, Jun. 1997.

Clarke et al., "Formal Methods State of the Art and Future Directions", ACM Computing Surveys, vol. 28, Issue 4, pp. 626–643, Dec. 1996.

Ogoubi et al., "Synthesis of Checker EFSMs from Timing Diagram Specifications", Proc. 1999 IEEE Inter. Symp. on Circuits and Systems, vol. 1, pp 13–18, Jun. 1999.

Caldwell, J. L., "Moving Proofs–as–programs Into Practice", Proc. 12th IEEE Inter. Conf. on Automated Software Engineering, 1997, pp. 10–17.

*Primary Examiner*—Kevin J. Teska
*Assistant Examiner*—Douglas W. Sergent
*Attorney, Agent, or Firm*—Donald P. Dinella

[57] ABSTRACT

A type annotation technique such that expressions are assigned and annotated with types in such a way that types can be efficiently maintained during inference without new syntactic restrictions being placed on the expressions or underlying logic within the verification system. More particularly, in accordance with the technique, expressions, i.e. terms, are annotated using a particular labeling scheme such that, during verification, if an expression is annotated the verification may proceed without any additional type inference or type checking with regard to that expression.

11 Claims, 1 Drawing Sheet

TYPE ANNOTATION METHOD FOR USE IN VERIFICATION TOOLS

FIELD OF THE INVENTION

The present invention relates to verification systems and, more particularly, to an annotation technique useful in such verification systems.

BACKGROUND OF THE INVENTION

Verification systems play an important role in the design of complex systems in allowing for the automated testing of the underlying system design and the identification of potentially unsound constructs. Nuprl is a well-known interactive theorem-proving system, see, e.g., R. L. Constable et al., *Implementing Mathematics with Nuprl Proof Development System*, Prentice-Hall, Inc., Englewood Cliffs, N.J. 1986, employed in verification tools which has proven to be highly effective in a variety of applications. See, for example, P. B. Jackson, Exploring Abstract Algebra in Constructive Type Theory, In $12^{th}$ *Conference on Automated Deduction*, Springer, June 1994. Briefly, Nuprl is a computer system that supports the interactive creation of proofs, formulas, and terms in a formal theory of mathematics. One of the important features of Nuprl is that the system's logic takes account of computational meaning of assertions and proofs. Thus, the system is sensitive to the computational meaning of terms, assertions, and proofs, and the system can carry out the actions used to define such computational meaning.

Typically, users of Nuprl (and verification systems employing Nuprl) verify applications, e.g. protocols, by interacting with the system to construct a formal argument of correctness. Nuprl provides users with the facility for writing formal arguments and proof-generating programs in a well-known metalanguage, "ML". Users can employ Nuprl to create libraries of mathematical facts, definitions, theorems, and ML programs useful in generating proofs of theorems. For example, users supply the details of formal arguments and Nuprl checks the details of the argument from a verification perspective.

One of the main advantages and distinguishing features of Nuprl in this verification context stems from its highly expressive formal logic. In particular, many of Nuprl's theorem-proving benefits are an artifact of the technique's approach to so-called type theory. As will be appreciated, the "type" of an expression typically specifies some basic properties of the expression, e.g., the expression represents an integer value. The Nuprl programming language is widely recognized has having an extensive feature set for representing expression types very concisely and for representing a wide range of mathematical properties as types. The expressive power of Nuprl's type theory comes at a certain operational cost, that is, some of the traditional properties of type theories are not present. Indeed, Nuprl's approach to type theory is such that terms are viewed as "untyped", in the sense that one cannot determine from the syntax of an expression what, if any, type it is a member of. Thus, Nuprl's expressive power is advantageous in the verification of large-scale applications, such as certain protocol verification approaches, where the underlying formal mathematics is highly complicated.

However, while Nuprl's expressive power is a significant advantage, Nuprl's type theory approach, i.e., untyped terms, can lead to less than optimal results in certain applications, in particular, where processing speed is more critical than expressive power. That is, in certain system verification applications it is sometimes important to have terms, i.e., expressions, have associated types therewith. For example, so-called "term rewriting" frequently occurs in verification systems where the system will manipulate expressions during the verification process and replace equivalent expressions. Such term rewriting relies significantly on the use and access to type information. This is due to the fact that term rewriting involves successive applications of rewrite rules, and such rules are only correct when instantiated with terms of particular types. For example, the rewrite rule "x+0=x" is only valid in Nuprl when x is replaced by an expression of the type "integer". Thus, whenever this rule is applied, it must be verified that the expression for x has type "integer". In Nuprl, in order to ensure soundness of the inference mechanism, all properties must be proved such that each application of a rewrite rule will involve proofs that any expression substituted for variables of the rule has the type specified by that variable. As Nuprl's type theory mechanism is one where terms are basically untyped, its verification effectiveness in applications requiring speed over expressive power, e.g., applications employing term rewriting, is diminished.

Therefore, a need exists for a technique that allows for improved term rewriting while maintaining the expressive type properties of Nuprl in verification applications.

SUMMARY OF THE INVENTION

The present invention provides a type annotation technique such that expressions are assigned and annotated with types in such a way that types can be efficiently maintained during inference without new syntactic restrictions being placed on the expressions or underlying logic within the verification system. More particularly, in accordance with the invention, expressions, i.e. terms, are annotated using a particular labeling scheme such that, during verification, if an expression is annotated the verification may proceed without any additional type inference or type checking with regard to that expression. In accordance with the preferred embodiment of the invention, a first label and a second label are used for type annotation such that terms annotated with the first label are required to have their correctness proved and those having the second label require no further type checking or inference.

More particularly, in accordance with the invention, two annotations modes are used. Illustratively, in accordance with the preferred embodiment of the invention, the two annotation modes are defined as positive annotations and negative annotations. In accordance with the preferred embodiment, positive annotations are annotations that are not known to be correct, i.e., provable, and require proof. Further, a sequent with positive annotations will be provable only if all the positive annotations contained therein are provable. Further, in accordance with the embodiment, negative annotations are defined as true and require no further proof either alone or as part of a sequent. In accordance with the preferred embodiment of the invention, p is defined with a range over the set {+,−} and p values will be used as superscripts on term annotations. That is, in accordance with the preferred embodiment of the invention, annotations having a superscript of "−" are defined as negative annotations, and those annotations having a superscript of "+" are defined as positive annotations.

BRIEF DESCRIPTION OF THE DRAWINGS

Throughout this disclosure, unless otherwise noted, like elements, blocks, components or sections in the figures are denoted by the same reference designations.

DETAILED DESCRIPTION

Figure 1:
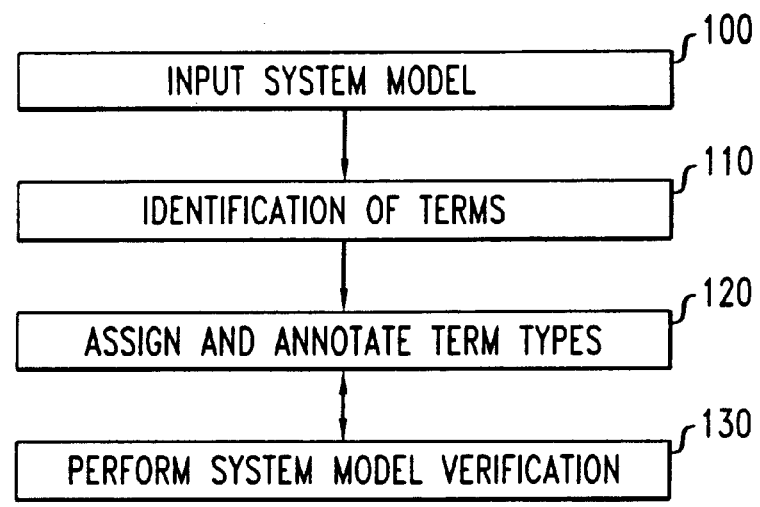
FIG. 1 is a illustrative flowchart of operations in accordance with the invention.

The present invention provides a type annotation technique such that expressions are assigned and annotated with types in such a way that types can be efficiently maintained during inference without new syntactic restrictions being placed on the expressions or underlying logic within the verification system. More particularly, in accordance with the invention, expressions, i.e. terms, are annotated using a particular labeling scheme such that, during verification, if an expression is annotated the verification may proceed without any additional type inference or type checking with regard to that expression.

The import of the invention is realized in verification systems employing the Nuprl interactive theorem-proving system. Hence, in order to appreciate and facilitate a complete understanding of the invention, a brief high-level overview of verification systems and Nuprl will now be discussed.

As will be appreciated, a system model is typically a computer program, block of program code, or set of program operations that, upon execution, simulates the intended properties, i.e., functions and/or features, of the subject system. The system model is typically designed to accept inputs, perform functions, and generate outputs in the same manner as would the actual system. Thus, by controlling and testing the system model through the use of a verification system, the functionality of the system can be tested to verify that its performance matches the desired system behavior of the system designer. One type of system testing is so-called formal verification. In formal verification, the system model, i.e., computer program, servers as input to a verification tool that converts the system model into a finite state machine. As is well-known, a finite state machine is a set of states and state transitions which mimic the operation of the system model in response to any given set of system model inputs. More particularly, each state represents a state or operational mode that the system model would enter given a set of inputs, and each state transition indicates the conditions, i.e., the value of system model inputs and system model variables, that must be satisfied for the system model to successfully transition from one state to another state.

Once a system model is converted to a state machine, a verification tool can test whether the system model operates in accordance with the desired set of expected behaviors, i.e., system properties. In operation, the verification tool varies the system model inputs and monitors which states the system model enters as a result of the inputs. As will be appreciated by those skilled in the art, this operation is known as searching the state space of the system model. Importantly, while searching the system model state space, the verification tool checks whether the system model enters a state or a cycle of states which the system designers have defined as so-called "bad" or unintended operations. Thus, the verification tool can identify for the system designer's particular problematic system design features that require redesign in order to comply with the intended system performance.

As discussed previously, Nuprl is a well-known system useful in the verification of a variety of practical applications (see, e.g., Jackson, supra.) such as, but not limited to, formal verification as discussed above. Formal mathematics in Nuprl is organized in a single library which is contains a plurality of files simulating a theory structure. Library objects can be definitions, display forms, theorems, comments or objects containing ML code. More particularly, definitions define new operators in terms of existing Nuprl terms and previously defined operators. Display forms provide notations for defined and primitive operators. Theorems have tree structured proofs which may or may not be complete. As mentioned previously, the main advantages and distinguishing features of Nuprl in this verification context stem from its highly expressive formal logic. In particular, many of Nuprl's theorem-proving benefits are an artifact of the technique's approach to so-called type theory. As will be appreciated, the "type" of an expression typically specifies some basic properties of the expression, e.g., the expression represents an integer value. The Nupri programming language is widely recognized has having an extensive feature set for representing expression types very concisely.

In particular, Nuprl's type theory has an extensive set of type constructors. The following are some example Nuprl types:

(1) $\prod n \in N \cdot B^n \to B^n$    An example Nuprl type is that of a type of functions mapping an $n$ and an $n$-ary bit-vector to an $n$-ary bit vector.

(2) $\{x \in N \text{ list} | x \neq \text{nil}\}$    An example Nuprl type of nonempty lists of natural numbers.

(3) $\sum n \in N \cdot B^n$    A collection of pairs $(n,b)$ such that $b$ is an $n$-ary bit-vector.

(4) $(x, y){:}Z \times N^+ \,/\!/\, (x_1 y_2) = y_1 x_2)$

A quotient type representing the rational number represented as pairs of integers with the usual equivalence relation.

Although Nuprl is a type theory, its term language is untyped in a fundamental way. For example, the following goal is well-formed, i.e., provable,:

$\bullet(\lambda x.17)(3+\text{true})=17 \in Z$.

The above goal is provable due to the fact that Nuprl has a lazy function application so that the left hand side of the goal expression can be computed as 17. The fact that no commitment is made to a conventional syntactic typing discipline for terms is largely responsible for what gives Nuprl its expressive power. In particular, Nuprl terms have the form: $\theta(\overline{x}_1.e_1; \ldots ; \overline{x}_n.e_n)$ where $\theta$ is an operator word and in each operand $\overline{x}_i.e_i$, each of the variables in the sequence $\overline{x}_i$ binds in $e_i$.

For example, in Nuprl's syntax, a lambda term "$\lambda x.b$" could be written as lam(x,b) and a universally quantified expression "$\forall x \in A.B$" can be written as all(A;x.B). Note that in the latter expression for universal quantification there is no syntactic relationship between A and x, nor does the syntax specify that A is a type to be associated with x. Thus, at this level of Nuprl syntax, there is no distinction between types and terms. More particularly, in Nuprl, there are only terms, and any types which become associated with any terms are those which are proved to be types using Nuprl's inference rules. Further details of Nuprl's syntax and semantics is described in, e.g., D. J. Howe, Semantics Foundations for Embedding HOL in Nuprl, In M. Wirsing and M. Nivat, editors, *Algebraic Methodology and Software Technology*, volume 1101, pp. 85–101, Springer-Verlag, Berlin, 1996, which is hereby incorporated by reference for all purposes.

The invention provides a type annotation technique such that expressions are annotated with types in such a way that types can be efficiently maintained during inference without new syntactic restrictions being placed on the expressions or underlying logic within the verification system. In general, an annotated term is a term decorated with type expressions. A type annotation may be attached to a subterm, or to a binding occurrence of a variable. For example, let t be a subterm occurrence for the term e where t has an annotation T. Further, suppose subterm t has a scope of exactly one binding variable in term e, and that the binding occurrence of x has an annotation A attached thereto. Thus, the annotation on t is correct, i.e., provable, if for all closed terms a, $a \in A$ implies $e[a/x] \in T[a/x]$. As will be appreciated, the utility of type annotations in verification systems needs to extend beyond the fact that subterms are members of their annotated types.

For example, consider a defined operator, fact, for the factorial function over natural numbers. An illustrative proved typing property for fact is $\forall x \in N.fact(x) \in N$, where N is the type of natural numbers. Further, consider the term fact(e), where e is an arithmetic expression over the set of integer values. In Nuprl, such an arithmetic expression is typically assigned type Z, i.e., the type of integers, so a natural annotation for the term fact(e) would be fact(e:Z):N. Thus, given such an annotation, the subterm e has annotation Z and the entire term has annotation N. Assuming that the annotations are correct, it can be shown that $e \in Z$ and $fact(e) \in N$. If a lemma is applied to the annotated term (as is typically the case in the verification of practical systems), e.g., the lemma defined as $\forall x \in N.fact(x) > 0$, the verification system has to prove that $e \in N$. Preferably, the proof is a reference to the annotation, rather than a proof from first principles which is more costly to construct. However, the annotation on $e \in Z$ is not the desired type. Thus, more information is needed from the annotation in the above example. Such additional information is obtained by using a second kind of annotation, a so-called subannotation which indicates the type a term is expected to have by its context. In the above example, the typing property of fact indicates that this operator expects natural number arguments. Thus, in the expression fact(e), e will have its natural, i.e., result, type Z, but, will also have an annotation for its expected type N.

I have realized a technique that allows for type annotation and the proof of soundness of annotations in the context of Nuprl's type theory. More particularly, in accordance with the invention, two annotation modes are employed which are illustratively referred to herein as "polarities". Illustratively, the two annotation modes are defined as positive annotations and negative annotations. In accordance with the invention, positive annotations are annotations that are not known to be correct, i.e., provable, and require proof. Further, a sequent with positive annotations will be provable only if all the positive annotations contained therein are provable. Further, in accordance with the invention, negative annotations are defined as true and require no further proof either alone or as part of a sequent. In accordance with the preferred embodiment of the invention, p is defined with a range over the set $\{+,-\}$ and p values will be used as superscripts on term annotations. That is, in accordance with the preferred embodiment of the invention, annotations having a superscript of "−" are defined as negative annotations, and those annotations having a superscript of "+" are defined as positive annotations. Advantageously, the annotation technique of my invention allows for the retention of useful typing properties in expressions, while at the same time imposing no restrictions on the expressive power of the logic. Further, the invention is directed to guaranteeing the correctness of reasoning in the system through the use of polarities to distinguish annotations that need to be proven correct before such annotations can be used in directly in proofs of the system.

FIG. 1 is a illustrative flowchart of operations in accordance with the invention. More particularly, a system model is received as input (block 100.) As discussed above, the system model is illustratively a computer program, block of program code, or set of program operations that, upon execution, simulates the intended properties of the subject system. In accordance with the invention, terms are identified in the system model (block 110) which are thereafter assigned and annotated with types (block 120.) As described previously, illustratively, the two annotation modes are defined as positive annotations and negative annotations. After the annotation of terms in accordance with the invention, the system verification is performed (block 130) using the annotated terms. As will be appreciated such verifications typically involve the introduction of additional terms, and these additional terms will usually be assigned annotations as well.

In accordance with the preferred embodiment of the invention, annotated and subannotated terms are inductively defined as follows:

1. If e is a subannotated term or an unannotated term, then e is an annotated term.
2. If e is not a variable and is either a subannotated term or an unannotated term, and if t is an unannotated term, then $ann^p(e;t)$ is an annotated term.
3. Let θ be an operator, and for i=1, . . . ,n suppose $e_i$ is an annotated term, $\bar{x}_i$ is a sequence of distinct variables and $a_i$, $t_i$ are unannotated terms. Write a as $a_1$ & . . . & $a_n$, $1 \leq n$, such that each $a_i$ is not a conjunction. Let $(x_1 \in A_1), \ldots ,(x_m \in A_m)$ be the sequence obtained by removing from the sequence $a_1, \ldots ,a_n$, all elements that are not of the form $x \in A$ for some variable x and some term A. Suppose the sequence $x_1, \ldots ,x_m$ is the same as the sequence $\bar{x}_i$. Then $\theta(\bar{x}_1.subann(e_1; a_1; t_1); \ldots \bar{x}_n.subann(e_n; a_n; t_n))$ is a subannotated term, and in each operand the variables $\bar{x}_i$ bind in $e_i$, $a_i$, and $t_i$.

Thus, in accordance with the invention, when annotations are viewed in a verification system employing Nuprl, ann⁻(e;t) appears as e:t, ann⁺(e;t) appears as e::t, and subann(e; a; t) appears as e:[a]t. Further, extending the substitution to annotated terms where parts of annotations are treated as components of the term, e is an annotated subterm of e' if either:

1. e=e';
2. e'=ann(e";t) and e is an annotated subterm of e"; or
3. e'=θ($\bar{x}_1$.subann($e_1$; $a_1$; $t_1$); . . . $\bar{x}_n$.subann($e_n$; $a_n$; $t_n$)) and for some i, e is an annotated subterm of $e_i$ and $a_i$=true (where true is the empty conjunction.)

In accordance with the preferred embodiment of the invention, annotated terms are typically of the form $ann^p(e;t)$ where e is a subannotated term. Further, in accordance with preferred embodiment, semantic judgments are extended to annotated terms via so-called erasure. These semantic judgements and their definition for unannotated terms is described in greater detail in D. J. Howe, supra. which is incorporated by reference herein. As will be readily understood, erasure is the operation of removing the annotations from a term so the term becomes unannotated. Thus, after erasure of the annotated term, the extension of the semantic judgements will be that to an unannotated term. More particularly, in accordance with the preferred embodiment, the erasure $\epsilon(e)$ of an annotated terms is defined as follows:

1. $\epsilon(e)=e$ if e is unannotated;
2. $\epsilon(ann^p(e;t))=\epsilon(e)$; and
3. $\epsilon(\theta(\overline{x}_1.subann(e_1; a_1; t_1); \ldots \overline{x}_n.subann(e_n; a_n; t_n)))=\theta(\overline{x}_1\epsilon(e_1); \ldots \overline{x}_n\epsilon(e_n))$.

Therefore, in accordance with the above erasure definition of the embodiment, for closed annotated terms t, t is a type if $\epsilon(t)$ is a type, and for closed annotated terms e and e', define $e=e'\in t$ if $\epsilon(e)=\epsilon(e')\in t$.

The semantics of annotations, in accordance with the invention, are further defined as a function of predicates $\Psi^p$ where $\Psi^p(e)$ is true if all the p-annotated subterms of e are correct as described previously. In accordance with the preferred embodiment of the invention, $\Psi^p(e)$ is defined by structural induction on e as described below. It should be noted that the predicate definition, described below, recognizes a need to quantify over closed substitution instances of operands. As such, to make the definition more compact, a notation convention was adopted. In particular, for an operand, e.g., $x_1 \ldots, x_n.e$, then by $e[\overline{a}]$, for $\overline{a}$ a sequence of terms of length n, such term represents $e[a_1, \ldots, a_n/x_1, \ldots, x_n]$. Thus, $\Psi^p(e)$ is defined by structural induction on e as follows:

1. If e is unannotated then $\Psi^p(e)$ is true;
2. If e is unannotated then $\Psi^p(ann^p(e;t))$ if and only if $e\in t$;
3. If $p\neq p'$ then $\Psi^p(ann^{p'}(e;t))$ if an only if $\Psi^p(e)$;
4. Let e be a subannotated term $\theta(\overline{s}\overline{s})$ where $\overline{s}$ is a sequence of n operands such that for all i, operand $s_i$ has the form $\overline{x}_1.subann(e_i; \overline{x}_1; t_i)$. Then $\Psi^p(e)$ if and only if for all i $(1\leq i \leq n)$ and for all closed $\overline{u}$, if $a_i[\overline{u}]$ is true then $\Psi^p(e_i)$; and
5. Let e be defined as in #4 above. Then $\Psi(ann^{p'}(e;t))$ if and only if the following:
   a) $\Psi^p(e)$;
   b) for each i such that $e_i$ has the form $ann^{p'}(e_i'; t_i')$: for all $\overline{u}$, if $a_i[\overline{u}]$ is true then $t_i'[\overline{u}]\subseteq_{e_i'}[\overline{u}]t_i[\overline{u}]$, where the relation $\subseteq_x$ is defined below;
   c) for each i such that $e_i$ does not have the form $ann^{p'}(e_i'; t_i')$: for all $\overline{u}$, if $a_i[\overline{u}]$ is true then $e_i[\overline{u}]\in t_i[\overline{u}]$; and
   d) for all $e_i' \ldots e_n'$; if for all i and for all $\overline{u}$ we have $a_i[\overline{u}]$ true implies $e_i[\overline{u}]=e_i'[\overline{u}]\in t_i[\overline{u}]$, then $e=\theta(\overline{x}_1.e'_1; \ldots \overline{x}_n.e'_n)\in t$.

As mentioned previously, a main advantage of the instant invention is that term annotations, as described above, support term rewriting to bolster and further extend the utility of verifications systems employing Nuprl. Realization of this advantage in accordance with the preferred embodiment of the invention comes with the recognition of two complications that arise regarding the support of term rewriting. First, in accordance with the preferred embodiment, operator functionality is specified. This is the property that holds that if the operands of the top operator in a particular term are replaced by terms that are equal relative to their expected types, then the new term is equal to the old term in the result type of the term. This addresses one term rewriting complication in Nuprl related to equality. More particularly, in Nuprl, there exists no absolute notion of equality between types. For example, it is possible that there are two different types T and T', such that e and e' are members of both of these types, and that e and e' are equal when considered as members of T, but not equal when considered as members of T'. In Nuprl, this equality complication is one of the costs of having such an expressive type theory. In accordance with the preferred embodiment of the invention, this equality complication in the context of annotations is addressed by explicitly requiring the functionality of operators. For example, in accordance with the preferred embodiment, an annotation, $o(e:[\;]U):V$ for $o(e)$, a requirement is made that if e is replaced by any e' such that e and e' are equal as members of U, then $o(e)$ and $o(e')$ are equal as members of V.

A further term rewriting complication arises regarding the relationship between the result type of a subterm and the expected type associated with its context. In the context of annotated terms in accordance with the invention and as described above, in an annotated term, e.g., $ann(e;t)$, the result type of the term is t. Further, in a term, e.g., subann (e';a;t'), e' has the expected type t' under the set of assumptions, a, i.e., if the assumptions a are true, then e' has the expected type t'. In terms of the previous example, in the annotated expression $o(e:[\;]U):V$, the result type of the entire expression is V, and the expected type of e is U, where the symbol "[ ]" in this annotated expression indicates that there are no assumptions. The further rewriting complication stems from the fact that the term e may itself have a result type, e.g., T, which signifies that e is actually e':T. Thus, the annotated term is $o((e':T):[\;]U):V$. As discussed previously, the support of term rewriting is important from an operational perspective. That is, the objective is to have equality in the result type to imply equality in the expected type, i.e., replace equals with equals. Thus, in accordance with the preferred embodiment, a minimal guarantee is defined as follows: If T, T' are types and t is a closed annotated term, then T is a local subtype of T' at t, written as $T\subseteq_t T'$, if for all $x\in T$ such that $x=t\in T$, $x=t\in T'$ (in terms of this example, we require that $T\subseteq_e U$). This "local subtype" property further facilitates the support of term rewriting when using annotated terms in accordance with the principles of the invention.

Having defined the semantics of annotations in accordance with the invention, an extension of the semantics of sequents to annotated terms will now be discussed. In accordance with the invention, a sequent is true if whenever the hypotheses are true and if all the negative annotations in the sequent are correct, then the conclusion of the sequent is true and all the positive annotations are correct. For practical reasons, in sequents over annotated terms all positive annotations must occur in the conclusion of the sequent. Further, in the conclusion $t\in T$ of a sequent, t is restricted to be unannotated. Thus, in accordance with the preferred embodiment of the invention, a sequent over annotated terms is defined as:

$$x_1:A_1, \ldots, x_n:A_1 \bullet t \in T$$

Thus, the sequent is true for all closing substitutions $\sigma$: if $\Psi^0(\sigma(T))$, and if for all i $(1\leq i\leq n)$ $\sigma(x_i)\in\sigma(A_i)$ and $\Psi^0(\sigma(A_i)$, then $\sigma(t)\in\sigma(T)$ and $\Psi^1(\sigma(T)$. Further, in accordance with the preferred embodiment, all negative annotations in the conclusion and/or hypotheses are taken to be true. As will be appreciated by those skilled in the art, many inference rules in Nuprl are parameterized by terms. Typically, in Nuprl, such terms are computed by tactics and are derived from the input goal. For example, the rule for instantiating a universal quantifier requires the instantiating term, and is calculated by matching against some part of a sequent. In accordance with the invention, if the sequent is annotated, such terms will carry annotations, and it will be desirable to preserve them when the term is used in the inference rule. A term with negative annotations can be accepted only if such annotations are correct. Thus, in accordance with the preferred embodiment of the invention, an annotated term e is soundly annotated according to the sequent $\Gamma \bullet T$ if for every maximal subterm e' of e of the form $\text{ann}^0(e''; t)$, e' is the annotated subterm of T or a particular hypothesis in $\Gamma$.

In addition to determining the soundness of annotated terms as described above, the preferred embodiment of the invention includes further rules addressing positive annotations and term rewriting. Such rules are realized as specific modifications to Nuprl's standard set of inference of rules and provide Nuprl with the advantageous properties of utilizing annotated terms in accordance with the invention. More particularly, in accordance with preferred embodiment, the main rule for positive annotations is directed to the inductive definition of $\Psi^p$ as detailed above. This so-called "top-level" rule is directed at the particular annotation that appears at the top, i.e., the outermost position, in a conclusion. In practical terms, when a conclusion of a sequent contain positive annotations, it would be operationally inefficient to break the sequent into separate proof obligations for each positive annotation contained in the conclusion. Thus, in accordance with the preferred embodiment, the top-level rule is applied in a repeated fashion to a conclusion until all the annotations of the conclusion have been proven correct. As will be appreciated, a rule comprises a set of premises and a conclusion, where the truth of the premises imply the truth of the conclusion. Thus, given a sequent which requires proving, that rule is applied to the topmost annotation in the conclusion of the sequent, and if the annotation has the form $\Psi(\text{ann}^p(e;t))$, the premises are derived as a function the requirements for the correctness of the annotation.

For example, a conclusion of the form $\Gamma \bullet \text{ann}^1(e; T) \in T$ has premises determined as a function of e. In particular, if m is the number of $e_i$ that have the form $\text{ann}^{p'}(e_i'; t')$, there are m+n+1 premises in the rule. Such premises correspond to various parts 5a) through 5d) of the inductive definition previously discussed. For example, there are m premises corresponding to part 5b) of the inductive definition. The formalization of these premises is direct, using $\overline{x}_i$ in place of $\overline{u}$ since the local subtype relation can be directly defined in accordance using Nuprl.

Further, there are n−m premises corresponding to part 5c) of the inductive definition which are also direct formalizations as described above. Regarding part 5a) of the inductive definition, premises are required which imply the soundness of any positive annotation in the $e_i$. In accordance with the preferred embodiment, $e_i$ takes the form $\text{ann}^{p'}(e_i'; t')$ such that a premise is defined in accordance with the conclusion $e_i \in t'$. Finally, the premise for part 5d) of the inductive definition relates to operator functionality and its formalization in Nuprl is direct (and will be readily appreciated by those skilled in the art) given Nuprl's standard equality expression attributes.

The above-described rule applies to top-level positive annotation. In accordance with the preferred embodiment, a rule also exists for positive annotations that are buried under negatively annotated or unannotated terms expressed as: $(\Gamma \bullet T[\overline{t}/x])/(\Gamma \bullet T[t/x])$, where t is an annotated term, $\overline{t}$ is the result of replacing in t all subterms of the form e::T by e:T, and where $\overline{t}$ is soundly annotated to the conclusion sequent. This rule is used in conjunction with the so-called "parameter checking" rule as discussed below.

In accordance with the preferred embodiment of the invention, in addition to the above-described new rules, there are several requisite modifications to existing primitive Nuprl rules in order to realize the benefits of the annotation scheme of the invention. Such modifications, in accordance with the preferred embodiment, to existing primitive Nuprl rules are as follows:

(A) Parameter checking (the so-called "cut rule")—There are a number of rules that are parameterized by terms. These terms appear in the premises, but not in the conclusion of the rule. Due to the semantics of sequents over annotated terms, in accordance with the invention, parameters which are soundly annotated according to the conclusion of the rule will be soundly annotated according to the premises, at a minimum for the existing Nuprl rules. For each such rule, in accordance with the preferred embodiment, a side condition, i.e., requirement, is included that the term, if it has negative annotations, the term is said to occur in the conclusion sequent. In other words, the side condition is defined as: if the parameter term is annotated, then the term is soundly annotated according to the conclusion of the rule.

(B) Removal of unsound premise annotations—For certain existing Nuprl rules, the addition of annotations in accordance with the invention negatively impacts the soundness of the rule. Thus, for such rules, e.g., induction rules, some annotations are removed from premises in order to maintain soundness.

(C) Addition of premise annotations—Some Nuprl inference rules introduce new term structure in premises, and annotations can be added. In accordance with the preferred embodiment, premise annotations were added to two rules, namely, the so-called "union elimination" rule and "product elimination" rule. The details of these two rules are discussed in greater detail in Constable, supra. at 160 and 163.

(D) Removal of well-formedness premises—Many Nuprl rules have so-called "well-formedness" premises which in order to take full advantage of my annotation scheme require modification because the annotations will often make proof of well-formedness premises unnecessary. As is well-known, a well-formedness premise is one which requires showing that a particular expression is a type. Therefore, in accordance with the preferred embodiment, a generic modification to all inference rules is made such that well-formedness premises are omitted if they are "entailed" by the conclusion's annotations. The notion of "entailed" as used herein means a sufficient condition for semantic soundness. For example, a well-formedness premise such as . . . $\bullet$ t$\in$ T is omitted if t occurs in the conclusion with T as either its result type or its expected type.

(E) Side conditions for positive annotations—In order to minimize the complexity of the annotation scheme, in accordance with the preferred embodiment of the invention, a limitation is placed on the number of Nuprl rules that apply to positive annotations. A majority of the existing Nuprl rules have a side condition that the conclusion sequent may not contain any positive annotations. Thus, this eliminates any impact of such annotations during inference. The exceptions to this side condition are the new rules for positive annotations, the new rules for rewriting, the cut rule and certain lemma instantiation rules, each as respectively described herein. Further, limitations are placed on the parameterized rules that may introduce terms with positive annotations. In particular, these rules include the new rules for rewriting, the cut rule, and a instantiating level variables rule.

In accordance with the preferred embodiment of the invention, the above-described new rules and modifications to existing Nuprl rules were implemented in the well-known Common Lisp programming language. Further, user-defined rules of inference, i.e., tactics, were written in the well-known metalanguage, ML. Tactics are ML programs that manipulate Nuprl data structures, e.g., proofs and terms. Terms in Nuprl are data structures implemented in Lisp that are viewed in ML as an abstract data type. The way in which my novel annotation scheme is viewed in ML and particular tactics which take advantage of the annotations will now be discussed. Preexisting tactics, when applied to sequents containing annotations, will behave as they would have if the annotations are not present. In accordance with the preferred embodiment, in ML, annotations are viewed as extra components of terms. For example, consider a single function for destructing terms:

$$dest_{13}\ term{:}term \rightarrow ((tok\#parm\ list)\#bterm\ list).$$

This function returns an operator (which is a token and a parameter list) and a list of so-called "bound terms". The type bterm is defined var list # term. When given an annotated term of the form:

$ann^P(\theta(\bar{x}_1\ .subann(e_1;\ a_1;\ t_1);\ \ldots\ ;\ \bar{x}_n\ .subann(e_n;\ a_n;\ t_n));t)$, in accordance with the invention, the function will return $\theta$ together with a list containing the elements $\bar{x}_1\ .e_1\ \ldots\ \bar{x}_n\ .e_n$.

Further, in using ML with the preferred embodiment of the invention, well-known constructor functions for terms will behave in a normal fashion. Thus, if the destructor and constructors are used in ML to copy a term, the copied term will not have any annotations. However, certain complications arise in view of term rewriting in that a substitution function implemented in ML to compute the result of applying a rewrite rule, and the existing implementation of the substitution will erase most of the annotations of the rule. Thus, in accordance with the preferred embodiment, to avoid the erasure of the annotations in such a case, four of the basic, well-known Nupri term-walking combinators are reimplemented to preserve annotations when reconstructing a term.

With regard to rewriting, Nuprl's approach is similar to that of other well-known tactic-based systems. That is, rewrites need to be mapped down to applications of primitive rules for operations such as lemma instantiation, substitution, etc. In Nuprl, a rewrite is a function that takes as input a term t and a typing environment and returns a new term t', a binary relation r, and a so-called "justification" for t r t'. The justification is used to build a proof of t r t'. For example, one type of justification is a tactic that proves a goal whose conclusion is t r t'.

In accordance with invention, Nuprl's rewriting mechanism is extended to take advantage of term annotation. In accordance with the preferred embodiment, rewriting extension is accomplished through a new form of justification and the modification of certain existing Nuprl combinators. Importantly, the new form of justification proffered herein works in tandem with the existing Nupri justification mechanism such that all kinds of justifications may be mixed without any negative impact on the overall result. More particularly, in accordance with the preferred embodiment, when a rewrite is given a term with negative annotations, it will produce the rewritten term in normal course, except the rewritten term will have positive annotations. The justification is similar to the standard tactic justification, except that the tactic must also prove the positive annotations. In accordance with the preferred embodiment of the invention, a new rule facilitates the above-described rewriting process such that the new rule is used in the combinator that maps a rewrite onto the immediate subterms of a term. The conclusion of this new justification rule has the form:

$\Gamma \cdot \theta(\bar{s}){:}A{=}\theta(\bar{s}'){::}A''\in T$, where for $1 \leq i \leq n$, $s_i$ is $\bar{x}.e_i{:}[a_i]t_i$ and $s'_i$ is $x.e'_i{:}[a_i]t_i$.

Further, for each i, the new justification of the preferred embodiment has a premise of:

$\Gamma$, $\Gamma_i \cdot e_i{=}e'_i \in t_i$, where $\Gamma_i$ is formed from $a_i$ in the same fashion as previously discussed with regard to refining positive annotations.

The preferred embodiment of the invention further includes one main new tactic in Nuprl that replaces the conclusion of sequent by an annotated version of that sequent. More particularly, given a goal $\Gamma \cdot T$, the new tactic finds the type for T, e.g., a particular universe U, and attempts to prove the goal $\Gamma \cdot T \in U$ in conjunction with the other standard set of Nuprl type checking tactics. Further, an examination of the proof occurs to compute annotations for subterms of T and replaces T by its annotated form.

The following are further operational aspects when using the annotations of the invention:

Operator constraints: For Nuprl's system defined primitive operators which will be readily understood by those skilled in the art, constraints were added to the annotations for these operators to enhance the effectiveness of the annotation scheme. In short, these constraints are directed to the preservation of annotations during inference.

Searching for annotated terms: Whenever a new annotated term is introduced in a proof, the term must be searched for and identified in the particular sequent being operated on. In accordance with the preferred embodiment, a well-known breath-first type search is used to identify such annotated terms.

Rewriting over propositional equivalence: Previously, the type of rewriting discussed herein was directed to term equality. However, so-called propositions which are well-known logical expressions also play a role in Nupri. Therefore, it is desirable to apply the equivalence of propositions in rewriting applications, however, such equivalence is not a standard equality relation in Nuprl. Thus, in accordance with the preferred embodiment of the invention, propositional equivalence is included such that if the annotation of a proposition term is P (i.e., the type of propositions) the rewriting process executes as if equality in P is the same as propositional equivalence.

As discussed previously, the present invention provides a type annotation technique such that expressions are annotated with types in such a way that types can be efficiently maintained during inference without new syntactic restrictions being placed on the expressions or underlying logic within the verification system using a particular labeling scheme such that, during verification, if an expression label require no further type checking or inference. The import of the invention is realized in verification systems employing the Nuprl interactive theorem-proving system.

Figure 2:
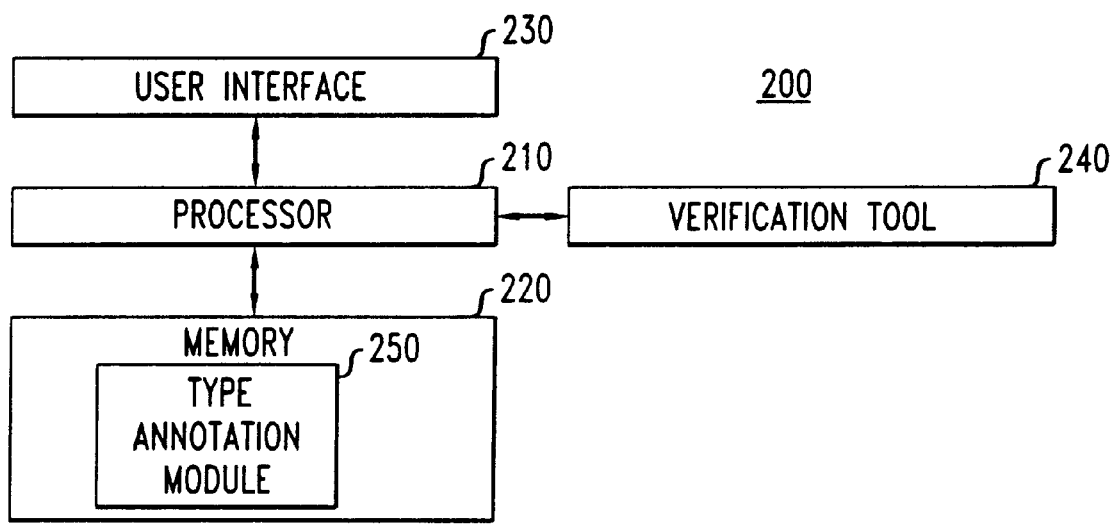
FIG. 2 is a block diagram of an illustrative embodiment of a verification apparatus configured in accordance with the invention.

For example, FIG. 2 is a block diagram of an illustrative embodiment of a verification apparatus 200 configured in accordance with the invention. As shown, verification apparatus 200 includes processor 210 electrically coupled to memory 220, interface 230 and verification tool 240. Processor 210 is operable to direct, and work in conjunction with, verification tool 240 to perform the verification of a particular system model. In accordance with the invention, processor 210 has access to type annotation module 250 stored, illustratively, in memory 220 for performing the type annotation of the invention as previously discussed. After such type annotation is completed on the system model, processor 210 supplies the type annotated model to verification tool 240. The results of the verification are reported by processor 210 to a user through interface 230, e.g., a graphical display monitor.

It should be noted that for clarity of explanation, the illustrative embodiments described herein are presented as comprising individual functional blocks or combinations of functional blocks. The functions these blocks represent may be provided through the use of either shared or dedicated hardware, including, but not limited to, hardware capable of executing software. Illustrative embodiments may comprise digital signal processor ("DSP") hardware and/or software performing the operations discussed below. Further, in the claims hereof any element expressed as a means for performing a specified function is intended to encompass any way of performing that function, including, for example, a) a combination of circuit elements which performs that function; or b) software in any form (including, therefore, firmware, object code, microcode or the like) combined with appropriate circuitry for executing that software to perform the function. The invention defined by such claims resides in the fact that the functionalities provided by the various recited means are combined and brought together in the manner which the claims call for. Applicant thus regards any means which can provide those functionalities as equivalent as those shown herein.

In order to further illustrate the advantages of my annotation technique an example of the verification of a well-known practical communications protocol will be presented in which the invention contributed to a significant performance improvement in terms of verification speed.

More particularly, the illustrative verification example relates to the well-known Scalable Coherent Interface ("SCI") protocol which is a IEEE standard for specifying communication between multiprocessors in a shared memory model. The details of the standard are found in IEEE Std. 1596-1992 entitled "The Scalable Coherent Interface". Further, a prior study and verification related to a part of the SCI protocol is described in A. Felty et al., A Correctness Proof of a Cache Coherence Protocol, In *Proceedings of the 11$^{th}$ Annual Conference on Computer Assistance,* IEEE, June 1996, which is hereby incorporated by reference for all purposes. The illustrative verification example to follow significantly improved the speed of the SCI protocol verification by applying and using the novel annotation scheme of the invention as will now be discussed.

Basically, in accordance with SCI, processors attempt to access memory and, in particular, try to access the so-called store from a doubly linked list. This linked list is useful in prioritizing processors so that read and write operation conflicts do not occur. The protocol is distributed and there is no global cache or global data structure for the linked list. Instead, each processors p has a set of local variables which keeps track of, for instance, its view of cache ($cv_p$), knowledge of whether or not its view is valid ($cs_p$), and its current successor ($succ_p$) and predecessor ($pred_p$) on the linked list, if any. All communication is via point-to-point message passing. Since a very large number of processors could be on the network (the subject IEEE standard specifies an upper bound of 64,000 processors), a significant amount of concurrency is present thereby complicating the understanding of the protocol.

The protocol is specified as a set of guarded actions. For example, the following is an action executed by the memory controller m:

buf[m]?read_cache_freshQ(p)→if status$_m$=Gone then buf[p]
  !read_cache_freshR(m, head$_m$, cv$_m$, gone) else buf[p]!read_
  cache_freshR(m, head$_m$, cv$_m$, ok) fi;

head$_m$:=p; if status$_m$=Home then status$_m$:=Fresh fi

In the above guarded action example, the action is executed if the first message in buf[m], i.e., m's message buffer, has type read_cache_freshQ(p) which indicates that processors p requires a read access. The message is removed from the queue and the message body is executed. A message read_cache_freshR(m, head$_m$, cv$_m$, gone) is sent to processors p, if some processor on the list had issues a write query. Otherwise, the response read_cache_freshR(m, head$_m$, cv$_m$, ok) is sent to p indicating that no other processors are on the list requesting a read access. Further, local variable status$_m$ is used by m to record whether a particular processor is on the list that has issued a write query. Also, local variable head$_m$ is maintained by m to record the head of the list. Verification of such guarded actions is critical to system performance employing the SCI protocol and the present invention was used to implement a successful verification as will now be discussed.

The SCI protocol is represented by twenty-one guarded actions: four for memory (including the above-described example) and seventeen for each processor. Communication is via fourteen types of messages, consisting of seven pairs of query and response messages. In addition to the above-described memory guarded action, memory has two actions for responding to write requests, one from a processor that is already on the doubly linked list due to a present read access, and one from a processor that is not yet on the list. The fourth memory action responds to a processor that requests to be taken off the linked list. The seventeen actions for each processor, include: one read request, two write requests, actions for requesting to be placed on the linked list or to be taken off the list, an action for purging others off the list when it has been given permission to write the store, actions for modifying the cache, and actions that respond to each kind of request from another processor. This high degree of communication among processors is a main contributor to the operational complexity and efficiency of using the SCI protocol. Thus, from a system verification standpoint this protocol presents interesting challenges.

In the verification of a protocol such as the SCI protocol a vast majority of the inference done in the proof of the protocol's correctness is term rewriting. In a typical interaction with a user during the protocol verification, the user would examine a sequent, select a few particular rewrite rules, and invoke a tactic that applies these rules and immediately afterwards applies a large set of rewrite rules. In testing my annotation scheme in the SCI protocol verification example, I measured the effectiveness of the annotation scheme by comparing the amount of time taken for some typical proof steps for both an unannotated version and an annotated version in accordance with the invention. In comparing the verification results in terms of total time, I measured approximately a factor of ten performance improvement when employing the novel annotation scheme herein.

The foregoing merely illustrates the principles of the present invention. Therefore, the invention in its broader aspects is not limited to the specific details shown and described herein. Those skilled in the art will be able to devise numerous arrangements which, although not explicitly shown or described herein, embody those principles and are within their spirit and scope.

I claim:

1. A method for verifying a system model, the system model comprising a plurality of terms, particular ones of the plurality of terms defining at least one performance attribute of the system model, the method comprising the operations of:

identifying a plurality of unannotated terms from the plurality of terms;

annotating particular ones of the plurality of unannotated terms with a first annotation, and annotating particular other ones of the plurality of unannotated terms with a second annotation;

proving the correctness of the particular ones of the unannotated terms which are annotated with the first annotation, the proving the correctness operation using a set of inference rules to prove the correctness of the particular ones of the unannotated terms which are annotated with the first annotation, at least one inference rule of the set of inference rules being a Nuprl inference rule, and the annotated terms having the second annotation requiring no proof of correctness;

performing a verification of the system model using the annotated terms having the first annotation and the annotated terms having the second annotation, the verification providing an indication whether the system model operates in accordance with a set of system properties; and adjusting the system model as a function of the indication.

2. The method of claim 1 wherein the system model is directed to a communications protocol.

3. The method of claim 2 wherein the set of system properties is specified by a user of the communications protocol.

4. The method of claim 3 wherein the set of system properties includes at least a set of guarded actions.

5. A method for verifying a system model, the system model comprising a plurality of terms, particular ones of the plurality of terms defining at least one performance attribute of the system model, the method comprising the operations of:

identifying a plurality of unannotated terms from the plurality of terms;

annotating particular ones of the plurality of unannotated terms with a first annotation, and annotating particular other ones of the plurality of unannotated terms with a second annotation;

proving the correctness of the particular ones of the unannotated terms which are annotated with the first annotation, the proving the correctness operation using a set of inference rules to prove the correctness of the particular ones of the unannotated terms which are annotated with the first annotation, at least one inference rule of the set of inference rules being a Nuprl inference rule, and the annotated terms having the second annotation requiring no proof of correctness; and performing a verification of the system model using the annotated terms having the first annotation and the annotated terms having the second annotation, the verification providing an indication whether the system model operates in accordance with a set of system properties and wherein the system model has a state space including a plurality of states and a plurality of state transitions.

6. A verification apparatus for verifying a system model, the system model comprising a plurality of terms, particular ones of the plurality of terms defining at least one performance attribute of the system model, the verification apparatus comprising:

a processor for identifying a plurality of unannotated terms from the plurality of terms, and annotating particular ones of the plurality of unannotated terms with a first annotation, and annotating particular other ones of the plurality of unannotated terms with a second annotation; and a verification tool for performing a verification of the system model using the annotated terms having the first annotation and the annotated terms having the second annotation, the verification being performed by providing an indication whether the system model operates in accordance with a set of system properties, the verification tool proving the correctness of the particular ones of the unannotated terms which are annotated with the first annotation by using a set of inference rules, at least one inference rule of the set of inference rules being a Nuprl inference rule, and the annotated terms having the second annotation requiring no proof of correctness.

7. The apparatus of claim 6 further comprising:

a memory for storing a annotation program, the annotation program being executable by the processor for annotating the unannotated terms with the first annotation and the second annotation.

8. The apparatus of claim 7 further comprising:

a user interface for displaying a result of the verification of the system model.

9. The apparatus of claim 6 wherein the verification tool executes at least one Nuprl program to perform the verification.

10. The apparatus of claim 9 wherein the Nuprl program includes a plurality of inference rules.

11. An article of manufacture taking the form of a computer-readable medium for verifying a system model, the article of manufacture comprising:

a identification code segment for causing a computer to identify a plurality of unannotated terms from a plurality of terms associated with the system model, particular ones of the plurality of terms defining at least one performance attribute of the system model;

a annotation code segment for causing the computer to annotate particular ones of the plurality of unannotated terms with a first annotation, and to annotate particular other ones of the plurality of unannotated terms with a second annotation; and a verification code segment for causing the computer to verify and provide an indication that the system model operates in accordance with a set of system properties by using the annotated terms having the first annotation and the annotated terms having the second annotation, proving the correctness of the particular ones of the unannotated terms which are annotated with the first annotation by using a set of inference rules, at least one inference rule of the set of inference rules being a Nuprl inference rule, wherein the annotated terms having the second annotation require no proof of correctness.

\* \* \* \* \*